Nov. 11, 1941. M. N. NOLING 2,262,036
KNOT TYING MECHANISM
Original Filed Dec. 17, 1938 2 Sheets-Sheet 1

INVENTOR
Martin N. Noling
BY
Parker, Carlson, Pitzner & Hubbard
ATTORNEYS

Nov. 11, 1941.              M. N. NOLING                 2,262,036
                        KNOT TYING MECHANISM
                    Original Filed Dec. 17, 1938        2 Sheets—Sheet 2
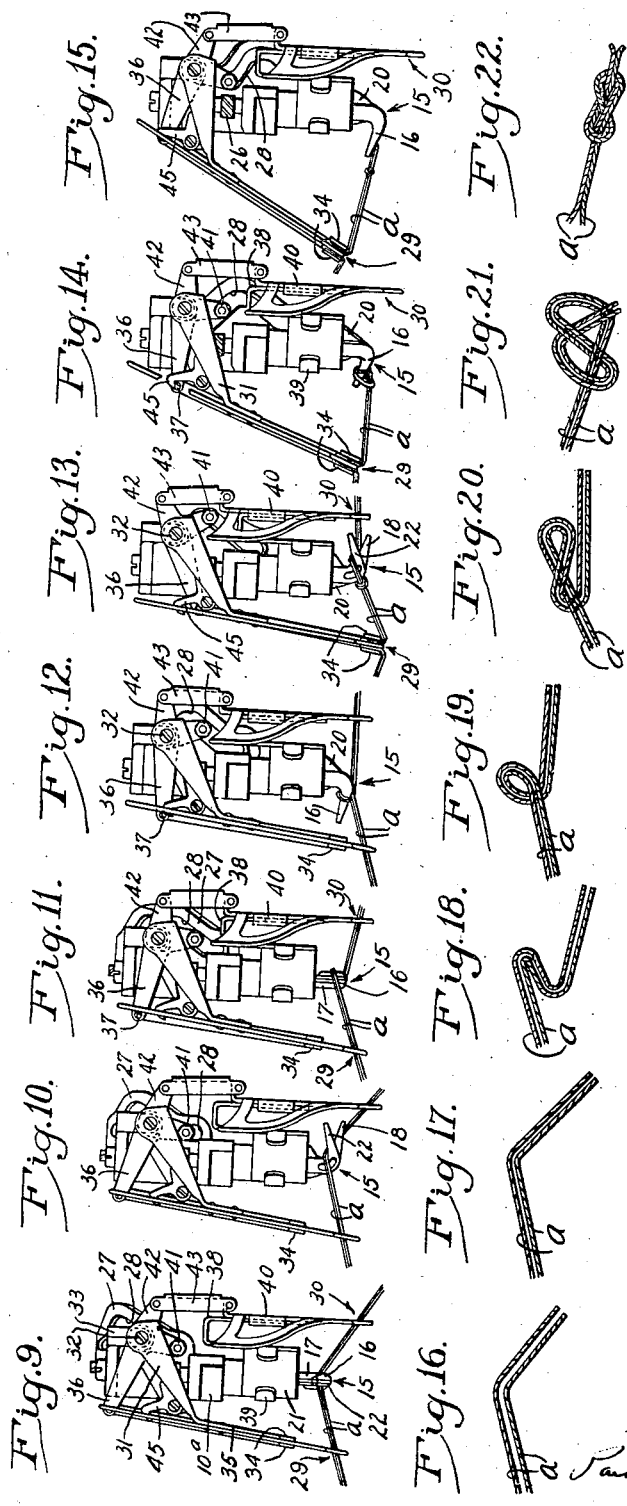
INVENTOR
*Martin N. Noling.*
BY
ATTORNEYS Patented Nov. 11, 1941

2,262,036

UNITED STATES PATENT OFFICE 2,262,036

KNOT TYING MECHANISM

Martin N. Noling, Rockford, Ill., assignor to Barber-Colman Company, Rockford, Ill., a corporation of Illinois Original application December 17, 1938, Serial No. 246,338, now Patent No. 2,234,190, dated March 11, 1941. Divided and this application August 23, 1939, Serial No. 291,482

3 Claims. (Cl. 289—3)

The invention relates to improvements in knotters or knot tying implements. The present application is a division of my copending application Serial No. 246,338 filed December 17, 1938, Patent 2,234,190, March 11, 1941. In my said copending application I have described and claimed a novel method of tying figure-eight knots. The knot tying mechanism which constitutes the subject matter of the instant application is particularly adapted to carry out the knot tying method for figure-eight knots disclosed in my said copending application.

In general, the knot tying mechanism herein disclosed constitutes an improvement on that shown in Howard D. Colman Patent No. 755,110, issued March 22, 1904. Said Colman patent discloses a knotter or knot tying implement adapted to unite two or more strands of thread or yarn together by tying a so-called "round knot" in the strands.

The particular form of knotter illustrated in the Colman patent is arranged to be strapped to an operator's hand and actuated by a thumb fork or trigger. Although the knot tying mechanism herein disclosed is also illustrated as being of this manually supported and digitally operated type, it may, however, be incorporated in a warp-tying or warp-uniting machine and may be either hand or power operated.

Knotters of substantially the form shown in said Colman patent have been used extensively for many years and with a high degree of success. In particular, they have been used by operators in textile mills for carrying out various thread tying operations such, for example, as to tie up broken threads, to tie a fresh bobbin thread to the strand being wound on a yarn spool in a spooling machine and for many similar thread tying operations required in the mill. The most extensive use of such knotters has heretofore been in cotton mills. In more recent years the increasing utilization of silk, rayon, celanese, and wool have brought new problems in knot tying. In uniting such materials it has been found that an ordinary round knot is likely to slip or become untied, especially during the jiggling and vibration to which the thread is subjected when passing through the harness and reeds of a loom. The present invention makes it possible to overcome this difficulty by uniting the threads with a figure-eight knot rather than a simple round knot, it having been found that a figure-eight knot formed in even silk, celanese, rayon or wool threads will remain firmly tied as the thread passes through a loom.

The general object of the present invention is to provide a novel apparatus for knotting together a pair of threads in such manner as to form a tight, strong knot capable of uniting even such materials as silk, rayon, celanese or wool, as well as cotton. More particularly, it is an object of the present invention to provide a knotter capable of quickly and accurately tying a plurality of threads by a figure-eight knot, the increase in speed and accuracy being in a large measure attributable to the fact that the threads can be initially applied to the knotter for tying simply by laying them across the knotter parts as distinguished from intertwining them about the knotter elements in some particular required configuration.

Further objects and advantages of the invention will become apparent as the following description proceeds, taken in connection with the accompanying drawings in which.

Figure 1:
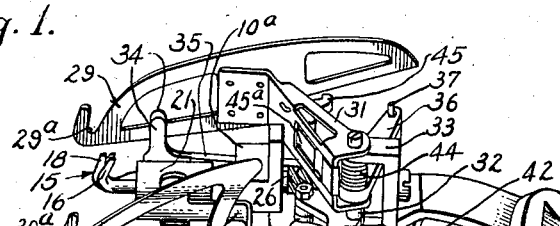
Figure 1 is a perspective view of a knotter embodying the invention.

Figs. 9 to 15, inclusive, are stop-motion plan views of the knotter showing the position of the tying bill and threads in successive steps of the knot tying operation.

Figs. 16 to 22, inclusive, are diagrammatic views of the thread showing its successive positions during the tying of the knot and corresponding to the tying bill positions of the device shown in the complemental series of Figures 9 to 15, inclusive.

Figure-eight knots, as tied in single strands of rope or the like, have been known for many years. The general purpose of such a knot in a single strand was to form a bump or obstruction on it as, for example, to prevent the rope from being unreeved through a pulley. I have found that this figure-eight knot can be used advantageously to unite strongly and securely the ends of two or more threads or similar small strands, by laying the threads side by side and tying them simultaneousluy in a figure-eight knot. Fig. 22 shows the completely formed knot, my novel method for accomplishing this knot tying operation being disclosed in my copending application referred to above.

The knotter herein shown is particularly adapted to unite threads in a figure-eight knot in accordance with the method disclosed in my copending application heretofore noted. As an aid to an understanding of the operation of the knotter mechanism it will be useful to consider first the several steps in the knot tying operation which it carries out. In brief, two or more threads $a$ to be united are laid side by side and adjacent bights are placed in the knotner (Figs. 16 and 17). A loop is formed in these bights of thread with the threads crossed once at the bottom of the loop in what may be termed a singly twisted loop (Fig. 19). Then the loop is turned through substantially 180° so as to form what may be termed a doubly twisted loop (Fig. 20). Thereafter the threads are snipped off adjacent the loop and the loop drawn over the sheared ends so that in effect the sheared ends are passed through the loop (Fig. 21). As the loop is drawn over the clamped, sheared ends of the threads, the loop is reversed or, in effect, turned inside out, thus shifting from the configuration of Fig. 20 to that of Fig. 21. Finally, the knot is drawn tight, as shown in Fig. 22. It will be seen that one key step in this method of tying a figure-eight knot is the preliminary formation of a doubly twisted loop.

Turning now to the particular form of knotter illustrated (particularly Figs. 1, 2, and 3), the mechanism shown embodies an upright standard 10 having a transversely extending pin 11 fixed to its lower end. Adjustably fixed to one end of this pin 11, by a split-sleeve clamp 12, is an inverted L-shaped supporting handle 13. A flexible strap 14 is secured to this handle 13 in such manner that it can be readily buckled about an operator's left hand to support the device while leaving the thumb of the hand free to actuate the knotter. This supporting arrangement is substantially the same as that shown, for example, in Fig. 1 of said Colman Patent No. 755,110.

Figure 5:
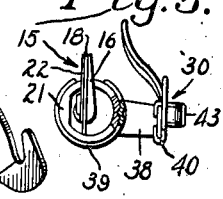
Fig. 5 is a detail end elevation, partly in section, of the tying bill and its associated cam barrel together with one of the thread guides.
Figure 6:
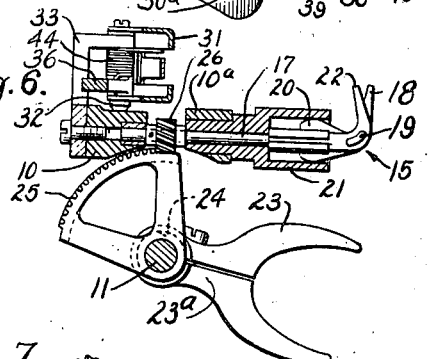
Fig. 6 is a vertical sectional view of the knotter along line 6—6 in Fig. 2.

The present knotter embodies a tying bill 15 which is rotated through two revolutions in each knot-tying operation, instead of one as in the case of tying an ordinary round knot. In the construction illustrated the tying bill embodies a fixed blade 16, fashioned as an integral lateral extension on the outer end of a rotatable knotter shaft 17 (Fig. 6), and a cooperating movable shear blade 18. The movable shear blade 18 is pivoted on the fixed blade 16 at 19, and includes a butt end cam enlargement 20 fitted within a generally heart-shaped cam aperture fashioned in a rotatable cam barrel 21 (Figs. 5 and 6). This cam barrel is in turn secured to an extension 10a on the standard 10. A bill spring 22 presses the pivoted shear blade 18 against the fixed blade 16.

As the knotter shaft 17 is rotated the tying bill 15 rotates and the jaws or blades 16 and 18 move to their open and closed positions in timed relation with the knotter shaft rotation. In particular, the contour of the interior of the cam barrel 21 is preferably such that beginning with the blades pointing upwardly (as shown in Figs. 6 and 9) the pivoted blade 18 swings from a partially open position to fully open position as the bill rotates clockwise (as viewed from the outer end) and is in general open through substantially 180° of rotation, after which it closes for the succeeding 180° of rotation. The tying bill construction is substantially like that shown in said Colman Patent No. 755,110 and, consequently further detail of descrption is believed to be unnecessary.

Figure 7:
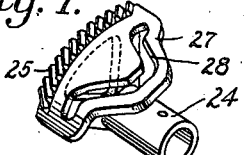
Figs. 7 and 8 are respectively detail perspective and developed views of an actuating cam and segmental gear included in the knotter.

Rotation of the knotter shaft 17 is accomplished by means of a thumb fork or trigger 23 (Fig. 6). This fork is secured by a split sleeve clamp 23a to a sleeve 24 (Figs. 1 and 7) journaled on the pin 11. An enlarged head on the outer end of the pin 11 prevents endwise displacement of the sleeve 24. Integral with the inner end of the sleeve 24 is a segmental gear 25 meshing with a skew pinion 26 (Fig. 6) fast on the knotter shaft 17. Consequently when the actuator fork 23 is oscillated downwardly, from the position shown in Fig. 6, the gear sector 25 causes the pinion 26, and the attached knotter shaft 17, to rotate in a clockwise direction (as viewed from the tying bill end of the shaft). For a purpose which will hereinafter appear, an integral sector cam 27, having a cam slot 28 therein (Fig. 7), is also fixed to the sector gear 25.

Figure 2:
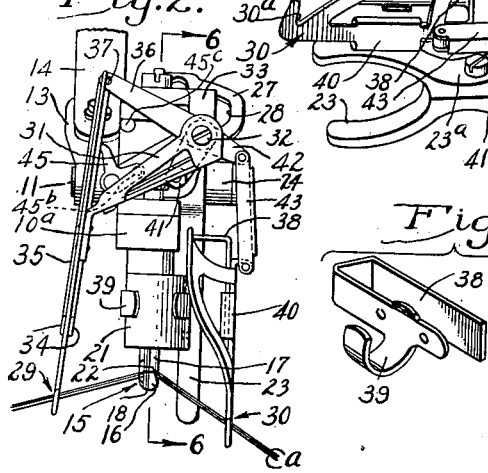
Fig. 2 is a plan view of the knotter of Fig. 1 with a pair of threads in place thereon preparatory to being tied.
Figure 3:
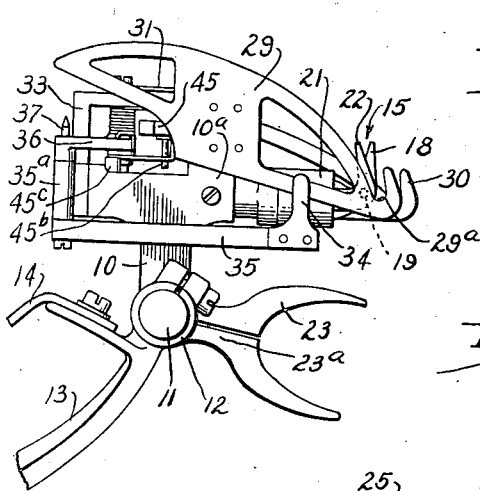
Fig. 3 is a side elevation of the knotter of Fig. 1.

Thread guides 29 and 30, respectively, are provided on opposite sides of the tying bill 15 (Figs. 1 and 2). These guides may be economically fashioned as stampings from sheet metal and each embodies an upwardly facing hook-shaped end or thread engaging hook 29a and 30a, respectively. A plurality of threads $a$ to be tied are laid across the tying bill and the thread guide hooks 29a and 30a (Fig. 2) and their end portions are tensioned forwardly away from the knotter so that the threads are seated in the bottoms of the guide hooks. It is thus unnecessary to wind the threads about the bill or other knotter elements in a particular configuration when initiating operation but, instead, they are simply laid across the tying bill and tying hooks as noted. The importance of this simplification and ease of the initial application of the threads to the knotter will be at once apparent.

The thread guide 29 serves to locate the threads in proper angular relation to the tying bill 15 during the knotting operation and also serves to strip the threads from the tying bill in such manner as to complete the knot. This stripping operation is accomplished by clamping the threads in the guide 29 and then swinging it laterally away from the bill 15. This positioning and stripping thread guide is of substantially the same construction as that shown in said Colman Patent No. 755,110 and, consequently, a detailed description is believed to be unnecessary. In general, it is sufficient for present purposes to note that the guide 29 is riveted or otherwise fixed to the outer end of a channel-shaped sheet metal supporting arm 31 (Fig. 1), which is in turn pivoted at its inner end by a pin 32 between the ends of a U-shaped bracket 33 screwed to the standard 10 (Fig. 6). Cooperating with the hook 29a and the guide 29 is a pair of sheet metal clamping fingers 34 (Figs. 1 and 3) fixed to the end of an arm 35. This arm 35 is reciprocable generally longitudinally of the guide 29 so that the fingers 34 may be removed from the retracted position shown in Fig. 1 forwardly toward the nose of the hook 29a to clamp the threads $a$ against the same at the proper point in the tying operation. The arm 35 is carried at its inner end by supporting arm 36 (Fig. 3) journaled on the pin 32 and pivoted to the arm 35 by a pin 37 which extends through a sleeve extension 35ª on the arm 35.

Figure 4:
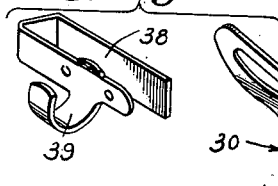
Fig. 4 is an exploded perspective view of one of the thread guides and its supporting bracket included in the device of Fig. 1.

The second thread guide 30 serves to shift portions of the threads $a$, on its side of the tying bill 15, in timed relation with the rotation of the latter. As was previously noted, the tying bill blades 16 and 18 open during each revolution of the bill but, as will hereinafter appear, it is desirable in tying a figure-eight knot that the threads should be engaged between the blades only during the second revolution. To this end the guide 30 is arranged to have an initial projected position (Fig. 9), which it maintains throughout at least the first half revolution of the tying bill 15, and a retracted position (Fig. 12), which it occupies during substantially the remainder of the next succeeding revolution and a half of the tying bill. To support the guide 30 for such movement a generally U-shaped sheet metal bracket 38 is utilized (Fig. 4). This bracket embodies a laterally extending curved arm 39 which embraces the fixed cam barrel 21 and frictionally engages the same to hold the bracket in position as shown in Fig. 2. Integral ears 40 on the sheet metal thread guide 30 embrace the outer arm of the bracket 38 so that the thread guide is supported for reciprocation along this bracket arm.

Actuation of the thread guides 29 and 30 in timed relation with the rotation of the tying bill 15 is accomplished by means of the sector cam 27. A cam follower roller 41 (Fig. 1), carried by one end of a bell crank 42 journaled on the pin 32, projects within the slot 28 in the sector cam. The other arm of the bell crank 42 is connected to the thread guide 30 by a link 43 which is pivoted at its opposite ends to the thread guide and to the outer bell crank arm. Similarly, on the other side of the knotter the clamp fingers 34 are reciprocated along the thread guide 29 in timed relation with the rotation of the tying bill since the arm 36, which supports the arm 35, is fixed to the bell crank 42.

In order to cause the thread guide 29 to be swung laterally away from the tying bill while maintaining the fingers 34 in clamping relation with the threads in the hook 29ª, a dog 45 (Fig. 3) is pivoted on the arm 31 and is yieldably urged by a flat spring 45ª to a projected position in which it engages the upper end of the pin 37 when the latter is in its forward extremity of movement. Consequently, upon the return movement of the pin 37, during the oscillation of the arm 36, the dog 45 is engaged by the pin 37, thereby swinging the thread guide 29 outwardly about the pivot pin 32. This outward swinging of the thread guide continues until the pin 37 reaches substantially the extremity of the return movement at which time the dog 45 rides out of engagement with the pin by the contacting of the pin 45ᵇ with the stop member 45ᶜ. A helical spring 44, connected between the arm 31 and the arm 36 of the bell crank 42, snaps the thread guide back to its initial position.

In the rotation of the tying bill 15 through two revolutions, as above mentioned, it occupies successively the positions shown in Figs. 9 to 15, inclusive. The corresponding positions of the thread guides 29 and 30 are also shown in these figures.

To condition the knotter for operation, the operator shifts the thumb fork 23 to its uppermost position so that the tying bill 15 faces upwardly and the thread guide 29 is swung inwardly with the clamp fingers 34 retracted, while the thread guide 30 is in its projected position, all as indicated in Fig. 9. A pair of threads $a$, which are to be tied are then simply laid across the tying bill 15 as well as the thread guides 29 and 30, the threads being tensioned slightly at their ends so that they occupy substantially the position shown in Fig. 9. Thus no special initial intertwining of the threads about the hooks is necessary. Then in order to tie a figure-eight knot to unite the threads all the operator need do is simply to depress the actuator fork 23.

Such a downward movement of the actuator fork 23 oscillates the sector gear 25 and sector cam 27 so that the tying bill 15 rotates in clockwise direction (as viewed from the bill and the knotter shaft). During the first 90° of tying bill rotation (Fig. 10) the blades 16 and 18 open but the threads $a$ are not engaged therebetween since the guide 30 is in its projected position. A further rotation of the bill 15, to complete a total arcuate movement of substantially 270° from its starting position, completes a singly-twisted loop in the threads (Figs. 12 and 19).

During the initial part of the second revolution the blades 16 and 18 open as before but this time the thread guide 30 is retracted so that the bill blades receive between them the adjacent portions of the threads (Fig. 13). At the same time the clamp fingers 34 are slid forward so that they clamp the threads on the opposite side of the tying bill. It should also be noted that the further rotation of the tying bill has formed a doubly-twisted loop in the bights of the thread which it engages, as shown in Fig. 20.

Figure 8:
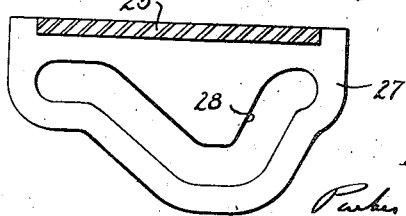

In general the blades 16 and 18 of the tying bill 15 open and close in the same manner during both the first and second rotations of the tying bill. The thread guides 29 and 30 are actuated, however, only after the completion of substantially the first half revolution of the tying bill and their positions during the second revolution of the tying bill are substantially different than that during the first revolution. This result is accomplished by the particular shape given to the slot 28 in the sector cam 27. Upon reference to Fig. 8 it will be seen that during the initial movement of the cam 27 the cam follower 41 moves through a straight portion of the slot 28 so that no motion is imparted to the thread guide actuating bell crank 42. Thereafter, the cam follower 41 moves through a generally U-shaped portion of the cam slot 28 so that the bell crank 42 and attached arm 37 are oscillated from the position shown in Fig. 10 to that shown in Fig. 13 and finally back to that shown in Fig. 15.

After the threads have been engaged by the open tying bill blades 16 and 18 as shown in Fig. 13, continued rotation of the tying bill 15 moves the blades to close so that they shear off the threads $a$ adjacent the tying bill and simultaneously clamp the sheared thread ends. Thereafter, the thread guide 29 is swung laterally from the position of Fig. 13 to that of Fig. 14 and finally to that of Fig. 15. During this swinging of the guide 29 the fingers 34 remain clamped against the threads so that the doubly twisted loop is stripped from the tying bill 15. Also during this stripping action the blades 16 and 18 remain in gripping engagement with the sheared ends of the threads, so that the latter are drawn through the doubly twisted loop in Fig. 21 and the knot drawn tight (Fig. 22). Upon such completion of the knot further rotation of the tying bill 15 to its initial upright position partially opens the blades 16 and 18 whereupon the sheared ends of the knotted threads are disengaged. Furthermore, the thread guides 29 and 30 return to their initial positions and the fingers 34 disengage the threads so that the knotted threads may be freely removed from the implement.

I claim as my invention:

1. A knotter for tying figure-eight knots comprising, in combination, a rotary tying bill having a shank and a pair of clamping and shearing blades extending at approximately right angles to the axis of the shank, a guide positioned at one side of the bill and shiftable in a direction generally parallel to the axis of the bill, means associated with the bill and rotating the same through approximately two revolutions for each tying operation and turning said bill, during such rotation, in a direction toward said guide from an initial position approximately perpendicular to strands extending from said guide and over the shank of the bill, means operating in each revolution of the bill to open the blades during the initial portion and to close the blades during the latter portion of each revolution, and means actuating said guide to position the strands first across the path of movement of both of the blades of the bill while open during the initial portion of the first revolution and then into position between the blades for seizure thereby in the initial portion of the second revolution.

2. A knotter for tying figure-eight knots comprising, in combination, a rotary tying bill having a shank and a pair of clamping and shearing blades extending laterally outward at an acute angle to said shank to form therewith a hook, means for supporting a pair of thread strands in parallel relation to each other with a bight of the paralleled threads engaged by said hook and with the standing parts of the bight angling forwardly away from the hook, actuating means associated with said tying bill and rotating the same through substantially two full revolutions to form a doubly twisted loop in the bight of a pair of threads positioned in engagement with it as set forth by said supporting means, means operating in each revolution of the bill for opening said blades during one portion and closing the blades during a second portion of each revolution, said supporting means including a thread guide located at one side of the bill and shiftable in a direction generally paralleling the axis of bill revolution, and means, operated by said actuating means in timed relation with the bill revolution, shifting said thread guide from an initial position in which the threads received by it extend across the path of the blades during said one portion of the first revolution to a second position between the blades for seizure thereby in said one portion of the second revolution.

3. A knotter for tying figure-eight knots comprising, in combination, three hooks disposed side by side in spaced relation, the central hook of the three being rotatable and at least one of the others being shiftable generally longitudinally of the axis of rotation of the central hook, actuating means associated with said central hook and said one side hook and moving the same through a predetermined cycle of movement from an initial position in which the hooks all face in the same direction and the two side hooks are displaced outward from the central hook in the direction of the latter's axis, such initial location of the hooks serving to form a three-point support for the bight of a pair of thread strands led through the three hooks and such that the standing parts of the bight leading out from each side of the central hook lie across the path of rotation of the nose portion of said central hook, said nose portion of the central hook comprising a pair of clamping and shearing blades, means operated in response to rotation of said central hook to open the blades during one portion of each revolution thereof and close the blades during the remainder of each such revolution, and said predetermined cycle of movement comprising substantially two full revolutions of the central hook and a movement of said one side hook from said initial position thereof after said blades have closed in the first revolution of the central hook to a second position in which the thread strands supported by said one side hook are positioned between said blades for seizure thereby in the initial portion of the second revolution of said central hook.

MARTIN N. NOLING.